United States Patent [19]
Takashi et al.

[11] Patent Number: 5,367,498
[45] Date of Patent: Nov. 22, 1994

[54] LATERAL DIRECTION DETECTION SONAR

[76] Inventors: Yoshida Takashi, 14-6-301, Kamokogahara 2-chome, Higashinada-ku, Kobe-shi Hyogo 658; Watanabe Syoichi, 19-11, Komezaki-cho, Shijyonawate-shi, Osaka 575; Yamada Katsuo, 6-16, Jyonan-cho 3-chome, Takatsuki-shi, Osaka 569; Hamada Tokihiko, 2-7-303, Kashinodai 3-chome, Nishi-ku, Kobe-shi, Hyogo 651-22; Hiraoka Yuzuru, 9, Takase-cho, 2-chome, Moriguchi-shi, Osaka 570, all of Japan

[21] Appl. No.: 829,002
[22] PCT Filed: Jul. 11, 1991
[86] PCT No.: PCT/JP91/00929
   § 371 Date: Mar. 9, 1992
   § 102(e) Date: Mar. 9, 1992
[87] PCT Pub. No.: WO92/01237
   PCT Pub. Date: Jan. 23, 1992

[30] Foreign Application Priority Data
   Jul. 11, 1990 [JP] Japan .................. 2-184970
   Jul. 11, 1990 [JP] Japan .................. 2-184971
   Jul. 12, 1990 [JP] Japan .................. 2-186709

[51] Int. Cl.$^5$ ............................ G01S 15/42
[52] U.S. Cl. .................... 367/107; 367/113
[58] Field of Search .............. 367/113, 111, 107; 342/182

[56] References Cited
U.S. PATENT DOCUMENTS

| 4,307,396 | 12/1981 | Slater | 342/182 |
| 4,620,137 | 10/1986 | Numaho et al. | 342/182 |
| 4,672,589 | 6/1987 | Yoshida et al. | 367/113 |

Primary Examiner—Daniel T. Pihulic

[57] ABSTRACT

The present invention relates to a PPI sonar for horizontally turning a transmitting and receiving transducer emitting and receiving ultrasonic signals in one direction within an azimuthal range in one angular direction and in the reverse angular direction to search the water in a sector form and for having the position of own ship defined at an off-centered point on the screen of an indicator to display underwater conditions in a corresponding wide sectorial display area. A PPI sonar according to the present invention comprises turning reference point setting device for setting a reference point (B) in horizontally turning the transmitting and receiving transducer within an azimuthal range of a search area in a clockwise direction and in an anti-clockwise direction or own ship's position setting device for setting the position of own ship, and means for defining a display area on an indicator to display searched underwater conditions thereon based on output signals produced by either one of these setting devices.

25 Claims, 12 Drawing Sheets

LATERAL DIRECTION DETECTION SONAR

TECHNICAL FIELD

The present invention relates to a lateral direction detection sonar which horizontally turns a transmitting and receiving transducer searching the water in a narrow sectorial search area to search underwater conditions in a wide range of directions and displays searched underwater conditions on an indicator.

Hereinafter. the present invention will be explained as embodied in a PPI sonar which searches the water in a wide range of directions by turning a transmitting and receiving transducer for emitting and receiving ultrasonic signals in one direction within an azimuthal range of a search area in a clockwise direction or in an anticlockwise direction in a horizontal plane to radiate ultrasonic signals successively in different directions and to receive echo signals coming therefrom so that searched underwater conditions are displayed in a sector form on an indicator.

BACKGROUND ART

Generally, a CRT indicator having 320 dots in a vertical direction and 240 dots in a horizontal direction is used for this type of apparatus as shown in FIG. 7. As one display mode, character information such as distance, bearing, azimuth, range and the like are displayed in an upper portion of the indicator having 24 dots in a vertical direction and in a lower portion thereof having 40 dots in the vertical direction, and a portion having 240×240 dots is used as a net display area in the remaining area of 256 (V)×240 (H) on the indicator to display searched information representative of underwater conditions horizontally extending from the own ship. As modes to present display examples on a display area, there are a normal display mode in which data obtained by searching the water in the whole range of directions are displayed in a circled area with its radius of 120 dots and with the position of own ship "A" (represented with Δ mark) at tile center of the circle as shown in FIG. 7, a dual display mode in which underwater conditions surrounding the own ship are displayed in an upper half portion of the indicator in accordance with bearings of targets with respect to the own ship and distances between the targets and the own ship and echo signals resulting from respective search signals radiated successively in different directions are successively displayed in a lower .portion of the indicator in a vertical direction as shown in FIG. 8, and an enlarged display mode in which the position "A" of own ship is moved from the center of the screen (off-centered), and the azimuthal search range is limited to search underwater conditions in a sector form and a searched area is displayed on the screen in a sector form with its radius of 180 dots as shown in FIG. 9. With the enlarged display mode. a range can be increased so that a search area will be large. and objects can be displayed in high density. i.e., in high resolution. by keeping a search area set as the same as with the normal display mode.

Referring to FIG. 9. a black figure "Q" seen in the sectorial search area represents a school of fish. If the fish school "Q" is moving in a right direction on the screen. it will leave the search area soon. Thus. the search area has to be changed in order to track it.

However. a search area (indicated by broken lines) will go out of the screen. if only the center "B" of the turning movement of the transducer (center of turning) indicated with a mark ● is changed. In order to fully display a search area with no any parts thereof missing after the search area is changed. the center "B" of turning movement has been changed after the position of own ship "A" had been moved, or the position of own ship "A" has been moved after the center "B" had been changed. Thus. prior art apparatuses have a problem that schools of fish may be lost due to the lack of promptness because at least two setting operations have been required.

FIG. 16A shows an example to search a sectorial area determined by limiting the azimuthal range of the turning movement, with a PPI sonar searching the water in the whole range of directions with respect to the own ship by turning the transmitting and receiving transducer. The position "A" of own ship is represented with a mark Δ: an area "$Y_1$" indicated by solid lines is the area being probed; and the center "$B_1$" of the turning movement in an area "$Y_1$" is represented with a mark ●while the search area "$Y_1$" being searched. A line "L" in a radial direction is a sweep line and is being turned in a rightward direction. A black figure indicates a school of fish "Q". Thus. the fish school "Q" in the figure has been drawn by the previous scan.

FIG. 16B shows a display in which the sweep line "L" has moved to the right edge. Only a part of the fish school "Q" is being displayed. since the school of fish "Q" had moved in the right direction. Thus. it is a general practice to move the sweep line "L" to the right edge and to issue a command to move the search area in a rightward or a leftward directions after seeing the result of the search in order to track the fish school "Q". It is assumed now that a search area "$Y_2$" is newly set. After the search area is changed. the center "$B_2$" in turning the transducer is designated with a mark ◯. However. the sweep line "L" has already started to move in a leftward direction when a new search area "$Y_2$" is set. The sweep line "L" turns to left even in the probing area "$Y_2$" as shown in FIG. 16(C). As a result. if the fish school "Q" continues to move in the right direction. only part of the fish school "Q" is displayed or no fish school is displayed the screen after the search area "$Y_2$" is set. Thus, prior art devices have such a disadvantage that in order to display the fish school "Q" next time. one has to wait until the sweep line L turns back from the left edge and the fish school "Q" might be lost during that time period.

DISCLOSURE OF THE INVENTION

An object of the .present invention is to provide a lateral direction detection sonar which searches the water in a wide range of directions by searching the water in a narrow azimuthal range of a search area by means of a transmitting and receiving transducer and by mechanically turning the transducer in a horizontal plane and displays searched underwater conditions in a sector form with the own ship as its center, the lateral direction detection sonar being adapted to be able to display a desired search area on the screen of an indicator effectively utilizing the screen by one setting operation, Another object of the present invention is to provide a PPI sonar which searches the water in a wide range of directions by turning a transmitting and receiving transducer emitting and receiving ultrasonic signals in a direction within an azimuthal range of a search area in one direction and in the reverse direction in a horizontal plane to radiate and receive ultrasonic signals successively in different directions and displays searched underwater conditions on an indicator in a sector form with the own ship as its center, the PPI sonar being adapted to be able to display a desired search area on the screen of an indicator effectively utilizing the screen by one setting operation, Another object of the present invention is to provide a PPI sonar which searches the water in a wide azimuthal range by turning a transmitting and receiving transducer emitting and receiving ultrasonic signals in one direction within an azimuthal range of a search area in one direction and in the reverse direction in a horizontal plane to radiate and receive ultrasonic signals successively in different directions and displays searched underwater conditions on an indicator in a sector form with the own ship as its center, the PPI sonar being adapted to set a reference point in rotating the transducer in one direction and in the reverse direction thereof so that the ownship is positioned at an appropriate point and a desired search area is displayed on the screen of an indicator in a manner to effectively utilize the screen of the indicator.

Another object of the present invention is to provide a PPI sonar which searches the water in a wide range of directions by turning a transmitting and receiving transducer emitting and receiving ultrasonic signals in one direction within an azimuthal range of a search area in one direction and in the reverse direction in a horizontal plane to radiate and receive ultrasonic signals successively in different directions and displays searched underwater conditions on an indicator in a sector. form with the own ship as its center, the PPI sonar being adapted to set the position of the own ship on the indicator so that the reference point in rotating the transducer is determined and a desired search area is displayed on the indicator. Another object of the present invention is to provide a PPI sonar which searches the water in a sector form determined by a detection range with respect to the own ship. an azimuthal range in which a transmitting and receiving transducer is rotated and the reference point of rotation of the transducer by turning the transmitting and receiving transducer radiating and receiving ultrasonic signals in one direction and displays searched underwater conditions after setting the position of own ship and the reference point in rotating the transducer on an indicator. the PPI sonar adopting a method for displaying a changed search area when the search area is changed so that a fish school can be followed favourably.

Another object of the present invention is to provide a PPI sonar which searches the water in a wide range of directions by turning a transmitting and receiving transducer emitting and receiving ultrasonic signals in one direction within an azimuthal range of a search area in one direction and in the direction in a horizontal plane to radiate and receive ultrasonic signals successively in different directions and displays searched underwater conditions on an indicator in a sector form with the own ship as its center. the PPI sonar being adapted to automatically move the search area and a display area corresponding to the search area in response to the movement of a target.

According to a first feature of the present invention. a PPI sonar for horizontally turning a transmitting and receiving transducer emitting and receiving ultrasonic signals in one direction within an azimuthal range in one angular direction and in the reverse angular direction to search underwater conditions.extending from the own ship in a sector form and to display the searched underwater conditions in a sector form with the position of own ship at the origin of the sector on an indicator comprises turning reference point setting means for setting a reference point in turning the transmitting and receiving transducer, display means for displaying the reference point in turning the transmitting and receiving transducer on the indicator, and own ship's position setting means for determining the position of own ship for indication based on output signals of the turning reference point setting means, With regard to the first feature of the present invention. when the turning reference point is changed by the turning reference point setting means to change the search area, the position of own ship is set by the own ship's position setting means based on the setting to change the area. The position of own ship is established at a desired point on a line connecting the center of the turning movement after the turning reference point is changed and the center of the screen and extending the center of the screen, The desired point may be manually defined at an appropriate point. It is preferable, in order to improve prompt operability, to define the position of own ship at an intersection point obtained by intersecting a preset guide line with a line connecting the center of the turning movement after the search area is changed and the center of the screen and extending the screen center, or at an intersection point obtained by intersecting a circle inscribed in the guide line with a line connecting the center of the turning movement after the search area is changed and the center of the screen and extending the screen center. The guide line is preset in a manner that a probing area is displayed without no any parts thereof missing as far as the position of own ship is on the line.

According to a second feature of the present invention, a PPI sonar for horizontally turning a transmitting and receiving transducer emitting and receiving ultrasonic signals in one direction within an azimuthal range in one angular direction and in the reverse angular direction to search underwater conditions in a sector form and to display the searched underwater conditions in a sector form with the position of own ship at the origin of the sector on an indicator comprises own ship's position setting means for setting the position of own ship on the indicator, and turning reference point setting means for determining a turning reference point on the indicator based on output signals of the own ship's position setting means.

With regard to the second feature of the present invention, when the displayed position of own ship is changed to a desired position by the own ship's position setting means, the turning reference point will be set by the turning reference point setting means based on the setting to change the search area. With the setting of a turning reference point by means of the turning reference point setting means, the center of turning movement in a search area is automatically set on an extended line of a line connecting a changed position of own ship and the center of the screen. In this case. if the position of own ship is inappropriately set, the probing area is not fully displayed on the screen. The turning reference point is set efficiently by moving the position of own ship along a preset guide line when the position of own ship setting means is manipulated.

According to a third feature of the present invention, in a PPI sonar for horizontally turning a transmitting and receiving transducer emitting and receiving ultrasonic signals in one direction within an azimuthal range in one angular direction and in the reverse angular direction to search underwater conditions in a sector form determined in accordance with a detection range with respect to the own ship, a horizontal and angular search range in which the transmitting and receiving transducer is turned around and a reference point in turning the transducer and to determine the position of own ship and the reference point in the turning movement on the indicator and to display the underwater conditions thereon, a-display method works in a manner that when the center of turning movement in a sectorial search area is changed, the sweep line is turned in a direction in which the center of turning movement is moved if the present sweep line is in a changed new search area, while if the present sweep line is outside of a changed new search area, the sweep line starts to turn from an edge of the search area closer to the sweep line.

With regard to the third feature of the present invention. referring to FIG. 15A, it is assumed that a sweep line "L" is moving in a rightward direction in the present search area "$Y_1$" and a fish school "Q" is on the right side of the sweep line. The fish school "Q" has been produced with the previous scan. If the current center "$B_1$" of the turning movement is moved in a rightward direction to set a probing area "$Y_2$" having the center of the turning movement "$B_2$" (indicated with a mark ◯) and the sweep line "L" is continuously moved to the same direction (rightward turn) from the current position. the fish school "Q" can be tracked.

Referring to FIG. 19B, the sweep line "L" is moving in a leftward direction. If a search area "$Y_2$" is set with the fish school "Q" being the center of the turning movement therein and the sweep line "L" is moved in the opposite direction. i.e., in the rightward direction, the fish school "Q" can be tracked again.

Referring to FIG. 19C, the sweep line "L" has reached the right edge. Only part of the fish school "Q" is caught, since it has moved. In this case also, the probing area "$Y_2$" must be set and the sweep line "L" must be turned to right to track the school of fish "Q".

As seen from the examples in FIGS. 19A through 15C. when the current sweep line "L" is located in the probing area "$Y_2$" moved in the rightward direction. the sweep line "L" needs to be turned in the same direction in which the probing area is turned (right direction). regardless of the scan direction of the sweep line up to the present. As shown in FIG. 15D. if the sweep line "L" is located in the probing area "$Y_3$" moved in the leftward direction, the sweep line "L" needs to be turned in the same direction (left direction) in which the probing area has been moved, regardless of the scan direction of the sweep line up to the present.

Referring to FIG. 15E. when the sweep line "L" has come to the right edge of the probing area "$Y_1$", the probing area "$Y_2$" moved in the rightward direction is set. which is barely doubled with the probing area "$Y_1$". In this case. the probe is not interrupted and thus is easy to see if the sweep line "L" is scanned from the left edge in the probing area "$Y_2$" FIG. 15F shows a case in which the probing area "$Y_2$" partly doubles with the probing area "$Y_1$" In this case also. it is desirable to scan from the right edge in the probing area "$Y_2$" by the same reason. since the search area "$Y_2$" has been moved in the rightward direction.

As apparent from the examples shown in FIGS. 15E and 15F. if the current sweep line "L" is located outside of the probing area "$Y_2$" moved to the right. the sweep line "L" needs to be scanned from the left edge in the probing area "$Y_2$", regardless of the moving direction of the sweep line up to the present. Contrary. if the current sweep line "L" is located outside of the probing area "$Y_3$" moved to the left, the sweep line "L" needs to be scanned from the right edge in the probing area "$Y_3$". regardless of the scan direction of the sweep line up to the present.

According to a fourth feature of the present invention, a PPI sonar for horizontally turning a transmitting and receiving transducer emitting and receiving ultrasonic signals in one direction within an azimuthal range of a search area in one angular direction and in the reverse angular direction search the water in a sector form with the own ship at the origin thereof and for displaying searched underwater conditions in a sector form on an indicator with the position of the own ship at the center of the sector comprises detecting means for detecting objects being moved. turning reference point setting means for setting a reference point in turning the transmitting and receiving transducer based on output signals of the detecting means, and own ship's positisn setting means for determining the position of own ship for indication based on output signals of the turning reference point setting means.

BRIEF DESCRIPTION OF DRAWINGS

It is to be noted that in the drawings, like reference characters and numerals designate like or corresponding parts to perform the same functions.

EMBODIMENTS

Figure 1:
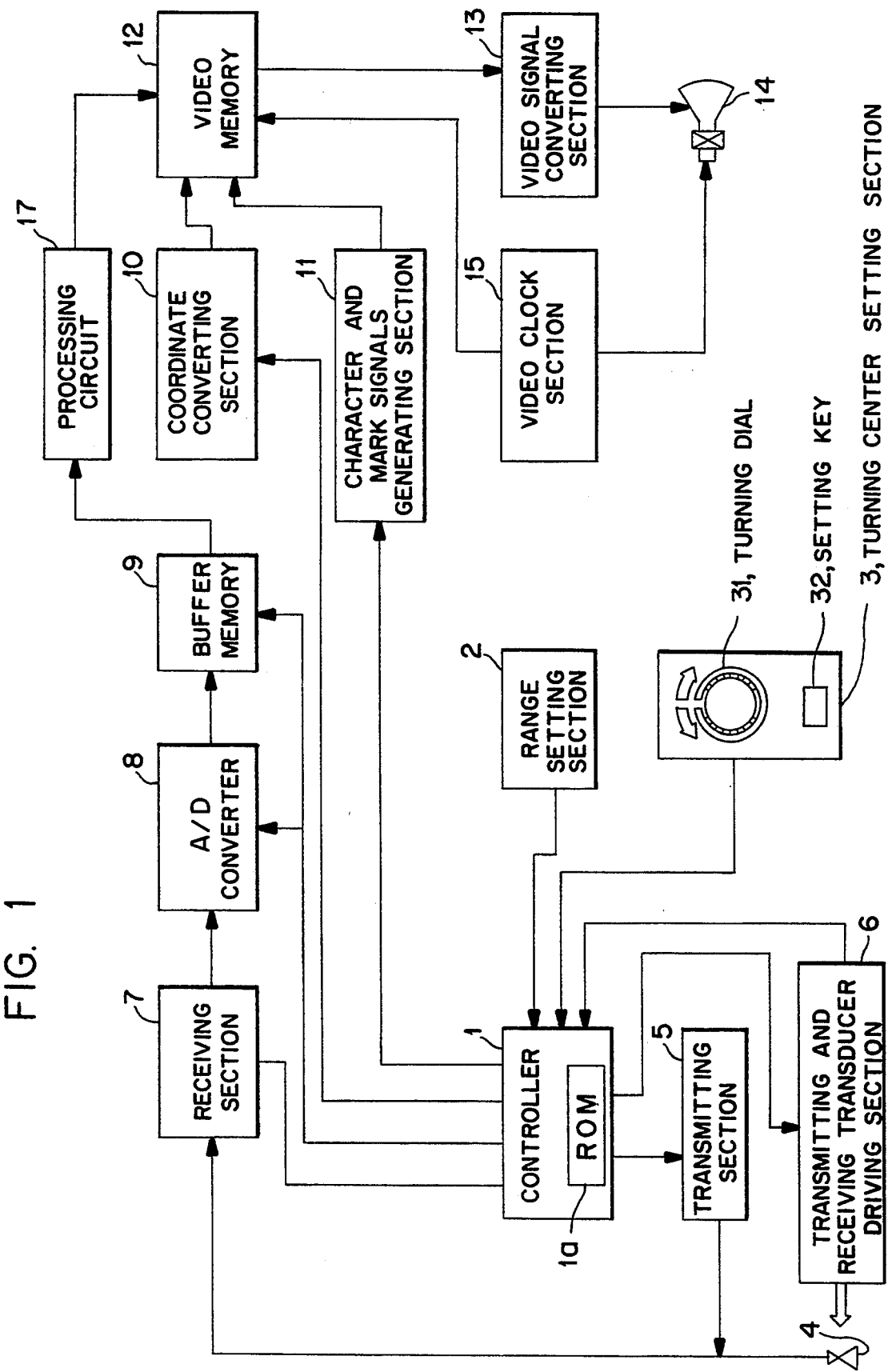
FIG. 1 shows a block diagram of an embodiment of a PPI sonar according to the present invention.

Referring to FIG. 1. a controller 1 for centrally controlling a transmitting and receiving system comprises a computing section for carrying out computations to determine a position of the own ship on the screen of an indicator. a control signal generating section for generating control signals for controlling a transmitting section to radiate search signals and for controlling a receiving section to vary the gain thereof, a pulse signal generating section for generating pulse train signals for turning a transmitting and receiving transducer and a clock signal generating section for supplying the receiving system with clock signals. Moreover, the controller 1 contains a ROM "1a" therein. which will be explained in detail later. A range setting section 2 defines an area to be searched by a PPI sonar and is provided with data representative of a detection range in a distance direction and data representative of an azimuthal detection range (turning angle) in which the transmitting and receiving transducer is turned in a clockwise direction and in an anti-clockwise direction and the like. A turning center setting section 3 sets a turning reference point, for example the center of turning. in turning the transmitting and receiving transducer for transmitting and receiving ultrasonic signals in a clockwise direccction or in an anti-clockwise direction. The turning center setting section 3 comprises a turning dial 31 for moving the center in turning the transducer in a clockwise direction or in an anti-clockwise direction and a setting key 32 for giving a command to move the position of own ship to a point obtained by performing computations based on a turning point set by the turning dial 31 as will be explained hereinafter. A transmitting and receiving transducer 4 transmits an ultrasonic detection pulse signal with its carrier frequency of 60 KHz in one horizontal direction and receives echo signals generated by objects to be detected. The transmitting section 5 supplies. in response to control signals supplied from the controller 1. the transmitting and receiving transducer 4 with search pulse signals at time periods determined by a detection range in a radial direction set by the range setting section 2. A transmitting and receiving transducer driving section 6 comprises a pulse motor for turning the transmitting and receiving transducer 4 to be directed in a specified direction and for turning the transducer in an anti-clockwise direction or in a clockwise direction and a sensor for generating signals representative of a direction in which the transducer is directed and for supplying the controller 1 with the signals.

The controller 1 computes an off-centered position of own ship on the screen of the display based on a signal indicating the central point of turning movement of the transmitting and receiving transducer supplied from the turning center setting section 3 and generates control signals for controlling the pulse motor in the transmitting and receiving transducer driving unit 6 based on signals representative of an azimuthal detection range supplied from the range setting section 2 and on signals indicating a pointing direction of the transmitting and receiving transducer supplied from the sensor in the transmitting and receiving driving section 6 and and supplies the driving section 6 with the resultant control signals. The transmitting and receiving transducer driving section 6 mechanically turns the transmitting and receiving transducer 4 so that its radiation and reception surface of the transmitting and receiving transducer 4 is directed in a specified direction, and mechanically turns the transducer an azimuthal detection range set in a horizontal plane in a clockwise direction or in an anti-clockwise direction. The transmitting and receiving transducer 4 radiates search pulse signals successively in different directions. A receiving section 7 amplifies and demodulates reception signals from the transmitting and receiving transducer 4, with the gain thereof being controlled by the control signals supplied from the controller 1. An analog-to-digital converter 8 samples the reception signals supplied from the receiving section 7 based on the clock signals calculated in the controller 1 based a detection range and supplied from the controller 1 to convert the signals from analog signals to digital signals.

A buffer memory 9 stores echo signals resulting from one search pulse emitted by the transmitting and receiving transducer 4 and supplied from the A/D converter 8. A processing circuit 17 implements signal processing to remove interference waves on the reception signals supplied from the buffer memory 9 and supplies the resultant signals to a video memory 12. A coordinate converting section 10 converts a position of a target defined in a polar coordinate system to a corresponding one in a rectangular coordinate system based on signals representative of an off-centered position of own ship and supplied from the controller 1 and signals indicating the distance of a target with respect to the own ship and signals representing the bearing of an object to be detected with respect to a reference direction and generates address signals to identify memory elements in a video memory 12 to write thereinto signals outputted by the processing circuit 17. A character and mark signals generating section 11 generates signals of marks such as a mark Δ indicating the position of own ship and a mark ⊙ indicating the center of the transducer turning movement based on data indicating a position of own ship and data representing a reference point in turning the transmitting and receiving transducer 4 in leftward and rightward directions. The video memory 12, with its number storage elements being more than the number of picture elements of a display 14, stores as video signals the reception signals outputted by the processing circuit 17 and the character and mark signals from the character and mark signal generating section 11 based on the address signals outputted from the coordinate converting section 10. A video signal converting section 13 converts the video signals read out from the video memory 12 based on video clocks to serial data. The resultant converted video signals are supplied to the indicator 14. The indicator may be comprised of, for example, a cathode ray tube. A video clock section 15 produces clock signals for reading out signals stored in the video memory 12 and horizontal and vertical synchronizing signals for the indicator 14.

Operations of the PPI sonar constructed as in the foregoing will be explained hereinafter.

Figure 7:
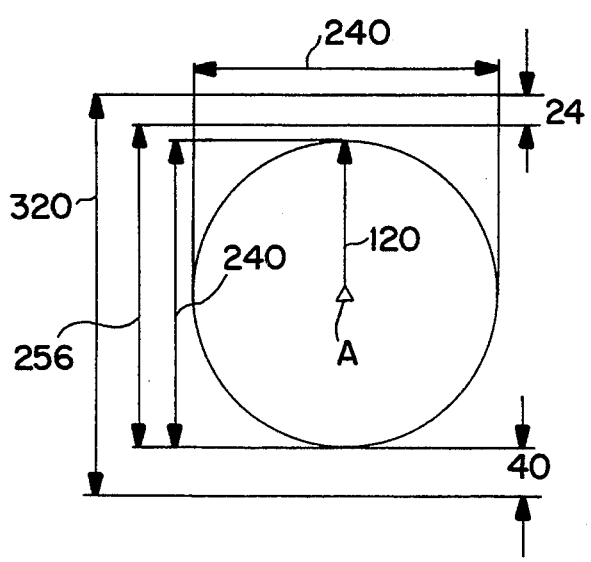
FIGS. 7 through 9 are diagrams showing a normal display mode. a dual display mode and an enlarged display mode respectively.
Figure 8:
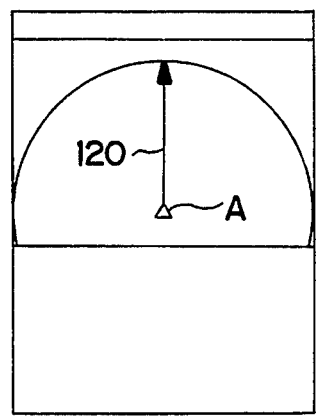
Figure 9:
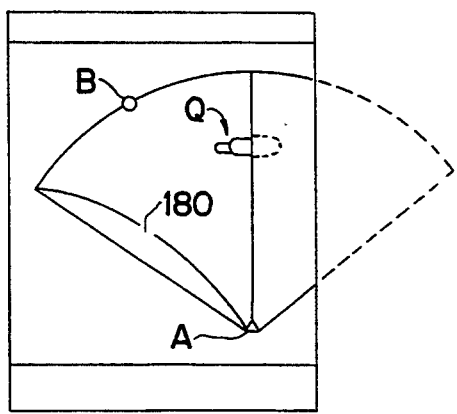

Since displays on an indicator of the PPI sonar obtained with a normal display mode (FIG. 7) or a dual display mode (FIG. 8) in which the transmitting and receiving transducer 4 is turned around and underwater conditions surrounding own ship are displayed on the screen of the indicator are the same as those obtained by prior art apparatuses, explanations on these display modes will be omitted here. Hereinafter, there will be explained an enlarged display mode in which an azimuthal range in moving the transmitting and receiving transducer (turning angle) ω is set, for example, 60°.

Figure 2A:
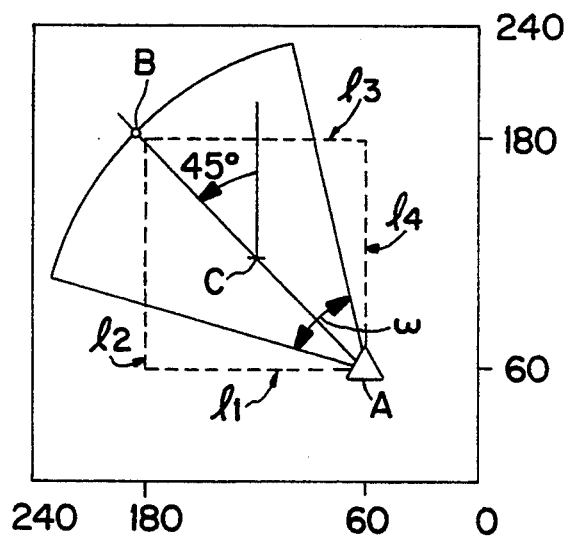
FIGS. 2A through 2C are diagrams for explaining a method for setting a position of own ship in the PPI sonar according to the present invention.
Figure 2B:
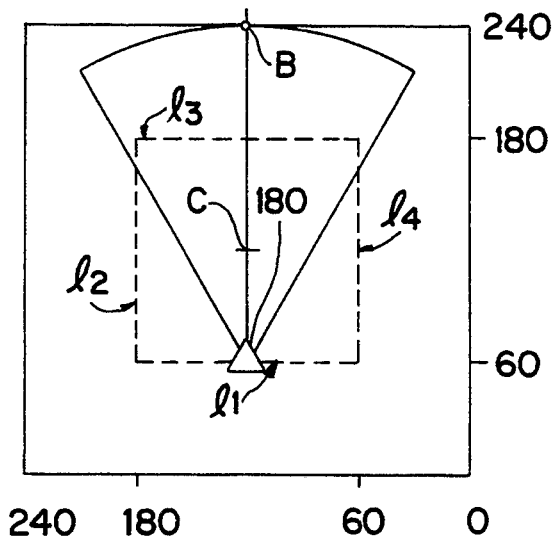
Figure 2C:
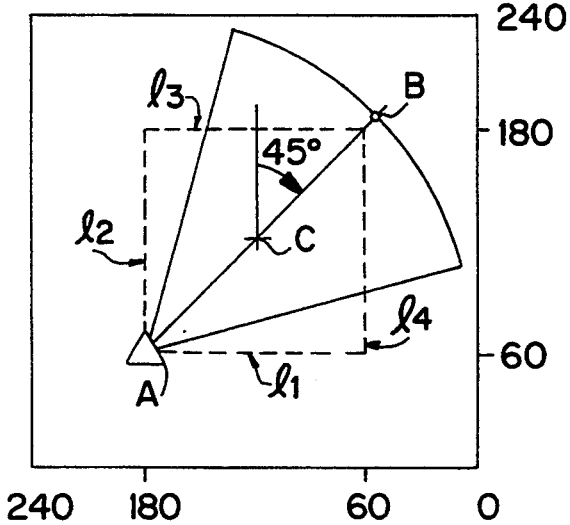

Referring to FIG. 2A, a right bottom corner of the screen is set as an origin and the X axis and Y axis are indicated with dot values. When thee center "B" of turning movement of the transmitting and receiving transducer within a search area for the PPI sonar is set at 45° in the port, the position of own ship "A" in this case is at an intersectien point obtained by intersecting a line connecting the center "B" of the turning movement and the center "C" of the screen with a line $l_1$ represented as $Y=60$. FIG. 2B shows a relationship when the turning dial 31 is turned to place the center "B" of the turning movement in the direction of heading line of own ship and FIG. 2C shows a case when the center "B" of the turning movement is positioned at 45° with respect to the own ship the starboard. In these cases also, there will be as the position "A" of own ship an intersection point obtained by intersecting a line through the center of the screen with a line $l_1$ represented as $Y=60$. As seen from FIG. 2B, no display parts are missed if the straight line $l_1$ meets an equation $Y \leq 60$. The fact that $Y=60$ is the most faverable will be described below.

In the same way, when the center "B" of the turning movement is positioned in an angular range between 45° and 135° in the starboard, the position "A" of own ship will be at an intersection point obtained by intersectiong a straight line $l_2$ represented as $X=180$ which is inside from the margin by 60 dots with a line connecting the center "B" of the turning movement and the center "C" of the screen. When the center "B" of the turning movement is positioned in an angular range between 45° and 135° in the port, the position "A" of own ship will be at an intersection point obtained by intersecting a straight line $l_4$ represented as $X=60$ with a line connecting the center "B" of the turning movement and the center "C" of the screen. When the center "B" of the turning movement is positioned in an angular range between 135° in the port and 135° in the starboard, the position "A" of own ship will be at an intersection point obtained by intersecting a straight line represented as $Y=180$ with a line connecting the center "B" of the turning movement and the center "C" of the screen. Each of these straight lines 1 is referred to as a guide line "L" hereinafter. Thus, each of these intersection points can be obtained by computing an intersection point obtained by intersecting a line connecting the center "B" of the turning movement and the center "C" of the screen and the guide line "L".

Figure 10:
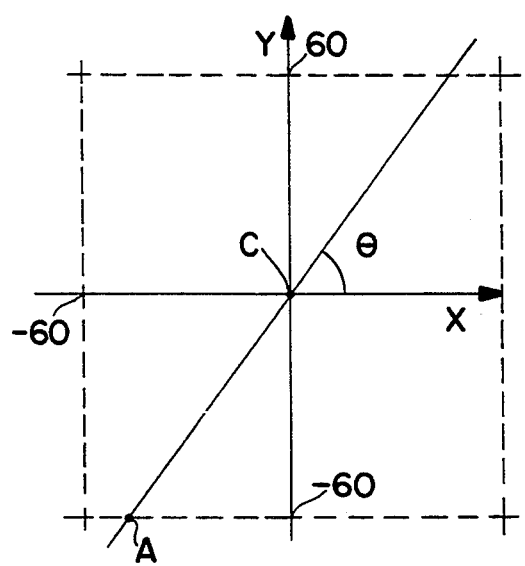
FIG. 10 is a diagram illustrating a relationship between a reference point for turning a transmitting and receiving transducer and the position of own ship in relatiorition to one embodiment of the PPI sonar according to the present invention shown in FIG. 1.

Referring now to FIG. 10, a method for determining the position of own ship on the screen of the indicator will be explained. The screen of the indicator is defined by X and Y coordinates. First. there will be explained a case in which the center B of the turning movement is in the first quadrant. "C" denotes an origin of the X and Y coordinates and a line $l_1$, a line $l_2$, a line $l_3$ and a line $l_4$ are expressed by equations $Y=-60$, $X=-60$, $Y=60$ and $X=60$ respectively. Since the line m is expressed as $Y=\tan\theta \cdot X$, the position of own ship "A" positioned in the third quadrant can be found by solving the following, equations:

$$Y=\tan\theta\cdot X$$

$$Y=-60$$

The position "C" of own ship can be found in the same manner when the center of the turning movement of the transmitting and receiving transducer is in the second, third or fourth quadrant.

The position "C" of own ship on the screen can also be obtained by the following method.

That is, a table listing all possible intersection points with the guide line "L" corresponding to the centers of the turning movement settable by means of the turning dial 31 (set by pitch of 6°) is stored in the ROM "1a" beforehand. When the center of the turning movement is desired to be set, a search is made in the table to find a corresponding intersection point. This method enables one to obtain the intersecting point at a high speed.

When an off-centered position "A" corresponding to a center of the turning movement "B" is determined, a mark ● representing the center "B" of the turning movement and a mark Δ representing the off-centered position "A" which are generated by the character and symbol signal generating unit 11 are supplied to the video memory 11 so that the center of the turning movement and the position "A" of own ship are displayed at corresponding points with the assigned symbols.

When the setting key 32 is pressed. the off-centered position "A" is defined and at the same time. the search range will be ±30° with the center "B" of the turning movement being the center thereof, since the turning anglular range ω is 60°. Signals representative of the turning angular range is supplied to the transmitting and receiving transducer driving unit 6 so that the transmitting and receiving transducer 4 searches underwater conditions in the search range. Reception data resulting from one search pulse and received by the transmitting and receiving transducer are stored in memory elements in the buffer memory 9 designated by addresses. The data read out of the buffer memory 9 are supplied to the processing unit 17. The output signals of the processing unit 17 and the output signals of the character and symbol signal generating unit 11 are written into memory elements in the video memory 12 identified by address signals outputted by the coordinate converting unit 10. The signals read out of the video memory 12 are supplied to the indicator 14 through the video signal converting unit 12 so that search areas in sector forms together with the position "A" of own ship and the center "B" of the turning movement are displayed with no parts missed as shown in FIG. 2 (A) through FIG. 2(C).

Figure 3A:
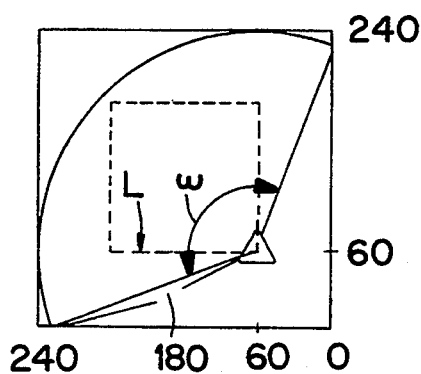
FIG. 3A through 3C are diagrams illustrating a search area when an azimuthal angle range in which a transmitting and receiving transducer is moved is set wide.
Figure 3B:
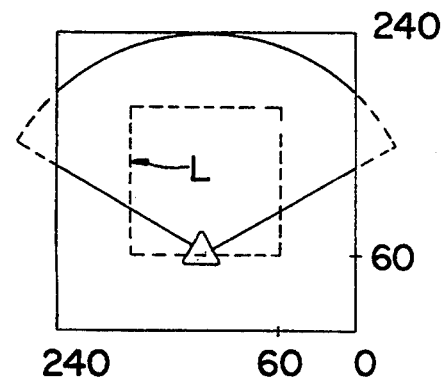
Figure 3C:
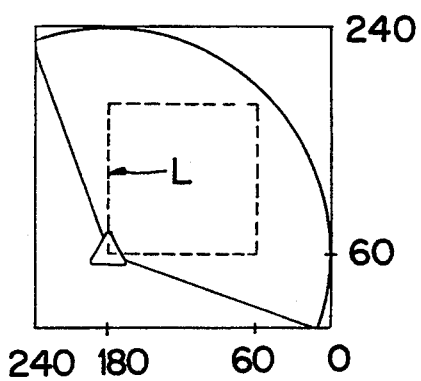

Although the lines being inside from the margin by 60 dots are set as the guide line L for the display area of 240×240 dots as in the foregoing, the guide line L may generally be represented, when a sectorial search area with its radius "r" which satisfies $L>r>L/2$ is to be displayed in a display area of L×L, by lines forming a square being inside from the borders of the display area by (L−r). As with the embodiment according to the present invention. when the radius "r" is $180 (=240 \times \frac{3}{4})$ and the guide line "["is the lines forming a square inside from the margin of the display area by 60 dots (=240/4). a settable maximum turning angiular range ω becomes such a wide angle as about 130° and the maximum area on the screen of the indicator can be be effectively utilized. as apparent from FIG. 3(A) through FIG. 3(C).

Figure 4:
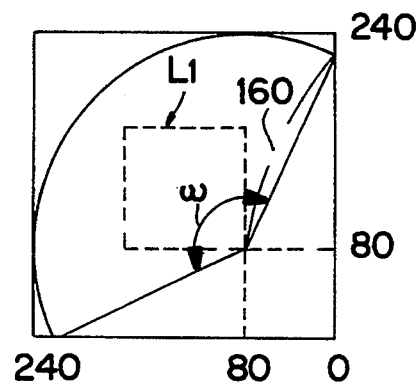
FIGS. 4 and 5 are diagrams illustrating a guide line set depending on changes of radius of a sectorial search area.

When the radius "r" of the probing area is 160 dots long in the display area on the screen of the indicator as in the foregoing. the guide line "$L_1$" is inside from the margins by 80 (=240−160) dots as shown in FIG. 4. and when the radius is 200 dots long, the guide line "$L_2$" is inside from the margins by 40 (=240−200) dots. Thus, the guide line "L" can be appropriately determined depending on an enlargement ratio of the enlarged display mode.

Moreover. although the lines inside of the margins were set as the guide line "L" in the display area of 240×240 in the foregoing. it is also possible to use lines outside of the display area as the guide line "L". In this case, when a condition r>L is met in a display area of L×L, the guide line "L" is lines forming a square outside of the boundaries of the display area by (r−L).

Figure 6:
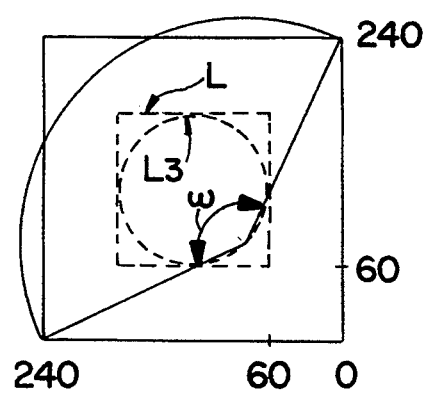
FIG. 6 is a diagram illustrating a search area of a wide azimuthal angle when a circular guide line is set.

Referring to FIG. 6. a circle "$L_3$" inscribed in the guide line "L" is used as a guide line. In this case, although some parts of a display are missed, the turning angle ω will become larger than 130°. Thus, such a guide line "$L_3$" is suitable for a system. presenting a display in a circular form.

Although the turning reference point in turning the transmitting and receiving unit 4 in the turning angle range is set at the center of turning movement in the turning azimuthal range in the foregoing embodiments, it is also possible to set the turning reference point, for example, at tile left edge of the probing area and to turn right the transmitting and receiving unit 4 at the turning reference point.

Figure 11:
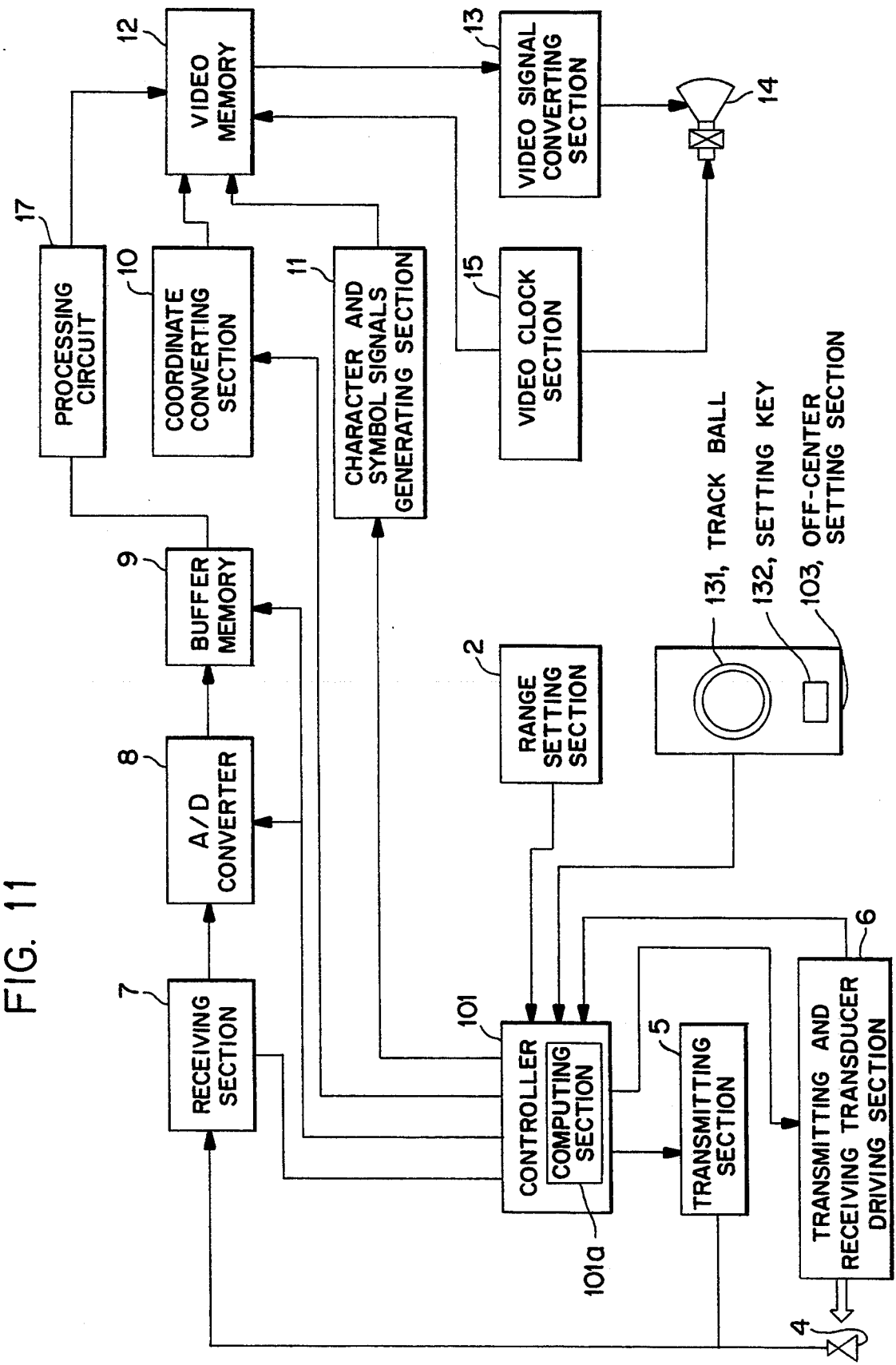
FIG. 11 is a block diagram of another embodiment oi a PPI sonar according to the present invention.

FIG. 11 shows another embodiment of the present invention which probes a desired search area by first setting the position of own ship on the screen of the indicator 14 to set the turning reference point in turning the transmitting and receiving unit in a clockwise and a counterclockwise directions.

Referring to FIG. 11, a controller 101 centrally controls a transmitting and reciving and contains a computing section "101a" therein, which will be described in detail hereinafter. An off-center setting. section 103 functions to determine the position of own ship on the screen of the indicator and comprises a track ball 131 for moving the position of own ship and a setting key 132 for defining the center of the turning movement of the transmitting and receiving unit obtained by performing computations based on the position of own ship set by the track ball 131.

The controller 101 calculates a turning reference point. for example, the center of turning, in turning the transmitting and receiving unit in the right and left directions in a horizontal plane within an azimuthal range of a search area based on signals representative of the position of own ship on the screen supplied from the off-center setting section 103. The controller 101 performs computations based on signals representative of the azimuthal range of a search area supplied from the range setting section 2 and on signals representative of a pointing direction of the transmitting and receiving transducer supplied from the sensor in the transmitting and receiving transducer driving section 6 to generate control signals for controlling a pulse motor in the driving section 6 and to supply t.he section 6 with the resultant control signals.

Next, operations of a PPI sonar constructed as shown in FIG. 11 will be explained.

There will be explained a case in which an enlarged display mode is selected and the turning azimuthal range (turning angle) ω is set, for example, as 60°.

Figure 12A:
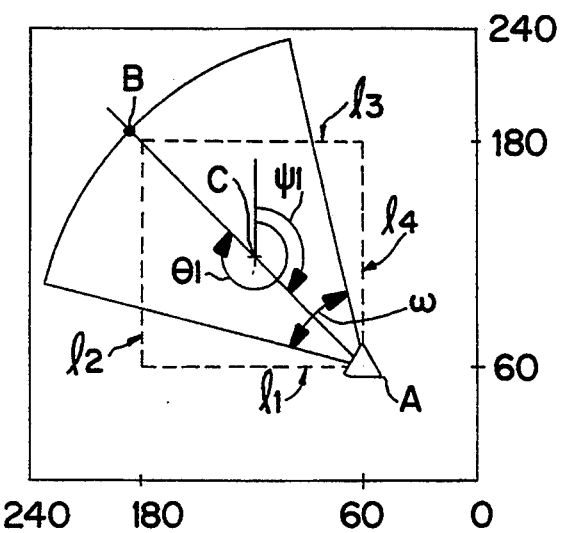
FIGS. 12A through 12C are diagrams for explaining a method for setting the center in turning the transmitting and receiving transducer in a PPI sonar according to Line present invention.

As shown in FIG. 12A, a right bottom corner of the display area is set as an origin and X axis and Y axis are indicated by dot values.

When the position of own ship "A" is set at a coordinate (60, 60), the bearing $\Psi_1$ of the position of own ship "A" with respect to the center of screen "C" is found by the computation section "101a", and the bearing $\theta_1$ of the center "B" of the turning movement with respect to the center "C" of the screen is computed in accordance with the following equation:

$$\theta = \Psi + 180 \qquad (1)$$

That is, the center of the turning movement "B" is on an extended line of a line connecting the position "A" of own ship and the center of the screen "C".

When the center of the turning movement, "B" is determired with respect to a position of the own ship "A", a mark ● indicating the center "B" of the turning movement and a mark △ indicating the position of own ship "A" generated at the character and symbol signal generating section 11 are supplied to the video memory 12 so that the center "B" of the turning movement and the position "A" of own ship are displayed with the respective symbols at corresponding points on the indicator 14.

When the setting key 132 is pressed down, the center "B" of the turning movement is defined. The azimuthal range in which the transmitting and receiving transducer is turned around is ±30° with the center "B" of the turning movement being a mid-point thereof, since the turning angle ω is 60°. Signals representative of the turning range are supplied to the transmitting and receiving transducer driving section 6 so that a search area defined based on the turning angle is searched by the transmitting and receiving transducer 4. Reception signals resulting from the search signals are stored in memory elements having addresses in the buffer memory 9. The data read out of the buffer memory 9 are processed by the processing circuit 17 to perform signal processes such as elimination of interference waves or the like. The resultant processed signals are written into memory elements of the video memory 12 identified by address signals outputted by tile coordinate converting section 10. The signals read out of the video memory are supplied to the indicator 14 through the video signal converting section 13 so that sectorial search areas together with the symbols representing the position "A" of own ship and the center "B" of the turning movement are displayed thereon without any parts of the search area being missed as shown in FIGS. 12A through 12C.

Figure 12B:
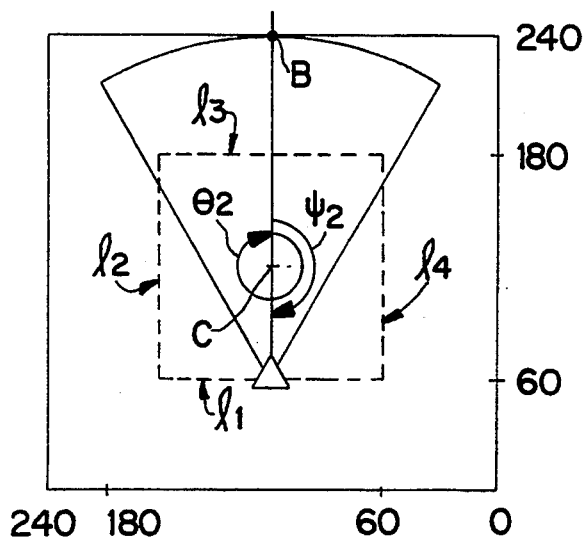

If the right side of the current probing range is desired to be probed, the track ball 131 is manipulated to move the position of own ship "A" in the left direction as shown in FIG. 12B. In the same manner, the bearing $\Psi_2$ of the off-centered position "A" is obtained and the bearing $\theta_2$ of the center "B" of the turning movement is computed in accordance with the equation (1). As a result, a search area determined based on the off-centered position "A" and the center "B" of the turning movement-is searched and displayed. FIG. 12C shows a case in which the off-centered position "A" is moved to a coordinate (180. 60).

In the foregoing, the off-centered position "A" is moved along the line $l_1$ of Y=60. As apparent from FIG. 12B. parts of a display are missed, if the line $l_1$ meets a condition Y≦60. The fact that a condition Y=60 is the most favorable will be described hereinafter.

Figure 12C:
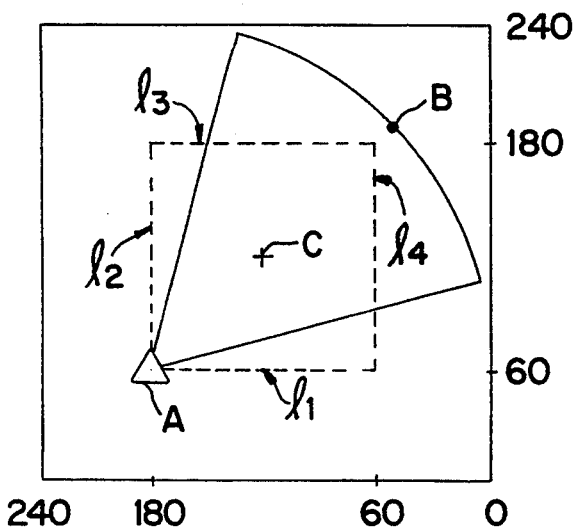

When the off-centered position "A" is moved upward from the position thereof shown in FIG. 12C, it just needs to be moved along a line $l_2$ represented as X=180 and then moved along a line $l_3$ of Y=180 and a line $l_4$ of X=60. In this way, if the off-centered position "A" is moved along the four straight lines (hereinafter referred to as a guide line "L") being inside of the boundary of the display area having 240×240 dots by 60 dots, no parts of the display are missed and a fast setting operation will be made.

Generally, when a sectorial probing area with radius "r" which satisfies L>r>L/2 is to be displayed in a display area of L×L, the guide line "L" may be set by lines forming a square inside from the margin of the display area by (L−r). When the radius "r" is 180 (=240×¾) and the guide line "L" is the lines forming a square inside from the margin of the display area by 60 dots (=240/4) as in the foregoing embodiment, a possible settable turning angle ω becomes such a wide angle as about 130° and thus the display area can be utilized in maximum.

Figure 5:
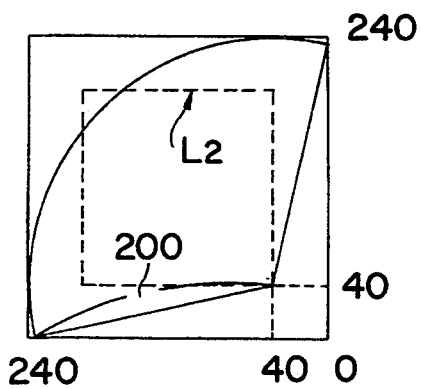

When the radius "r" of a search area is 160 dots long the display area having 240×240 dots, the guide line $l_1$ is inside from the margin of the display area by 80 (=240−160) dots, as shown in FIG. 4. When it is 200 dots long, the guide line $l_2$ is inside from the margin by 40 (=240−200) dots, as shown in FIG. 5. Thus, the guide line "L" can be appropriately set depending on an enlargement ratio of the enlarged display mode.

FIG. 6 shows a case in which a circle "$L_3$" inscribed in the above guide line "L" is used as a guide line. Although some parts of a display area are missed, the turning angle ω will be larger than 130°. Such a guide line "$L_3$" is suitable for a system having a circular display area on an indicator.

Although the center of the turning movement is used as the turning reference point in turning the transmitting and receiving unit 4 in an azimuthal range of a search area in the foregoing embodiments, the left edge of the search area can be the turning reference point and the transmitting and receiving unit can be turned right at this turning reference point.

Figure 13:
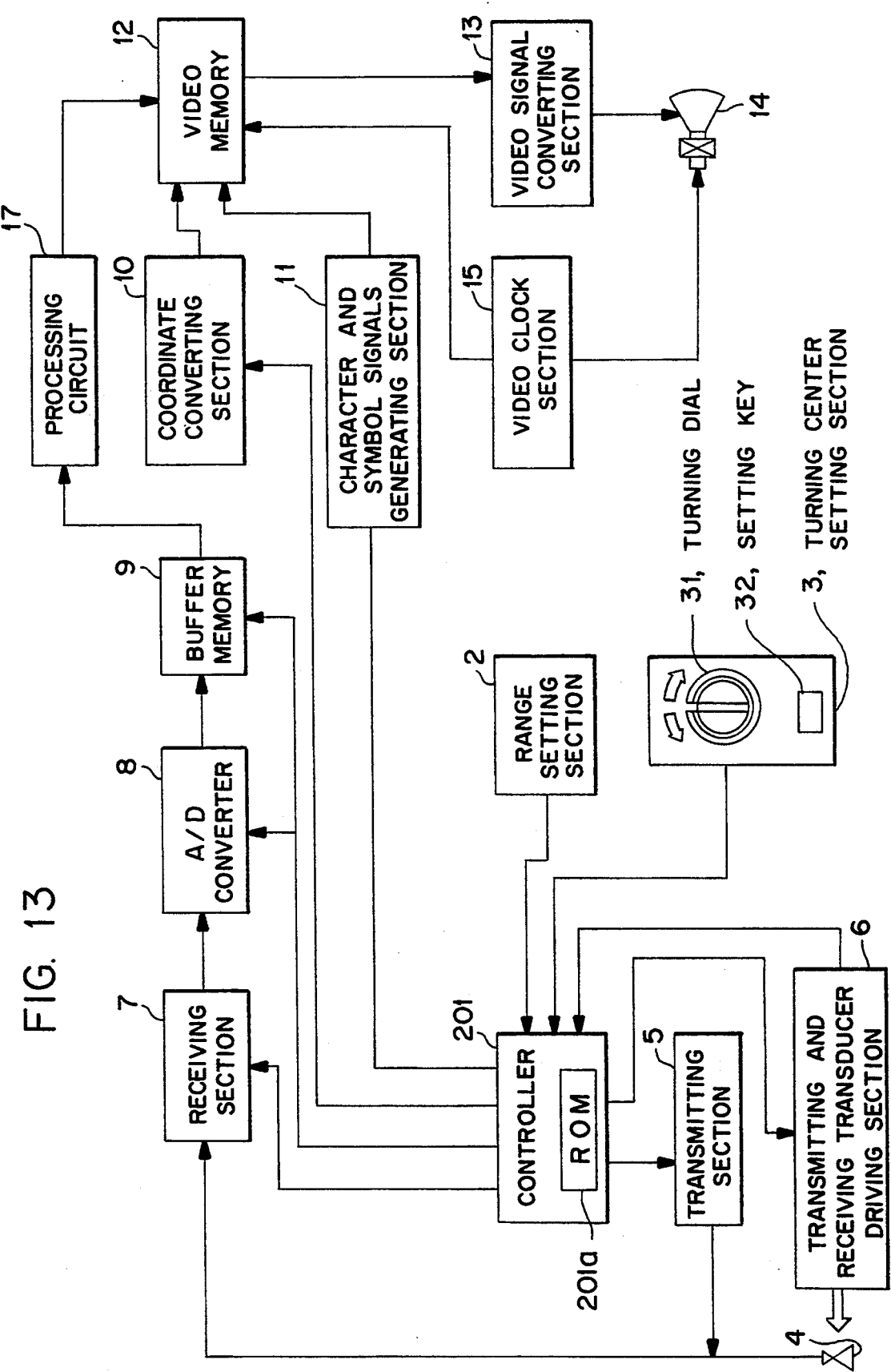
FIG. 13 is a block diagram of one embodiment of a PPI sonar on which a display method of the present invention is applied.

FIG. 13 shows a block diagram illustrating one embodiment of a PPI apparatus in which a display method for a PPI sonar according to the present invention is applied.

A controller 201 centrally controls a transmitting and receiving section and contains a ROM 201a storing programs for carrying out the fish school tracking method according to the present invention. A range setting section 2 is used setting and inputting a distance range of a search area and an azimuthal range thereof and the like. A turning center setting section 3 is for setting the center of the turning movement and is provided with a turning dial 31 for changing the center of the turning movement in any directions and a setting key 32 for establishing the position set by the turning dial 31. Transmitting and receiving transducer 4 radiates and receives ultrasonic signals in a beam form; a transmitting section 5 supplies the transmitting and receiving transducer 4 with radiation signals; and a transmitting and receiving transducer driving section 6 mechanically turns the transmitting and receiving transducer 4. A, receiving section 7 amplifies and detects received signals from the transmitting and receiving unit 4; and an analog-to-digital converter 8 converts received signals from the receiving section 7 from analog signals to digital signals.

A buffer memory 9 stores signals from the A/D converter 8. A processing circuit 17 implements signal processings such removal of interference waves or the like on the received signals supplied from the buffer memory 9 and supplies the video memory 12 with resultant processed signals. A coordinate converter 10 converts the position of an object to be detected defined in a polar coordinate system to a corresponding one in a rectangular coordinate system based on the signals indicating the position of own ship supplied from the controller 201 and signals representative of the distance of an object with respect to the own ship and the bearing of the the object with respect to the reference bearing and generates address signals for identifying storage elements in the video memory 12 to write the signals outputted by the processing circuit 17. A character and mark signals generating section 11 generates signals representative of the position of own ship (a mark △) or signals representative of the center of the turning movement (a mark ●). The video memory 12 stores tile signals supplied from the processing circuit 17 and character and mark signals from the character and mark signal generating section 11 as video signals. A video signal converting section 13 converts the video signals read out of the video memory 12 based on video clocks to .serial data. The converted video signals are supplied to the indicator 14. A video clock section 15 produces clock signals for reading the signals out of the video memory 12 and also produces horizontal and vertical synchronizing signals for the indicator 14.

Hereinafter, operations of the apparatus constructed as in the foregoing will be explained.

Figure 15A:
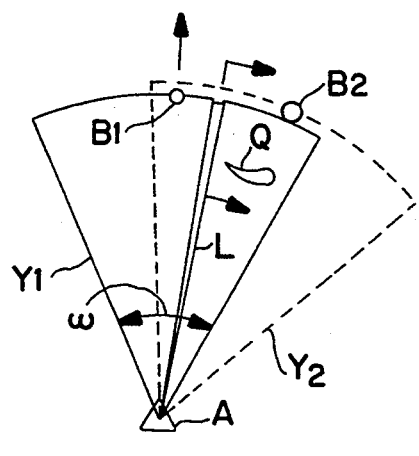
FIGS. 15A through 15F are diagrams for explaining the display method according to the present invention.
Figure 15B:
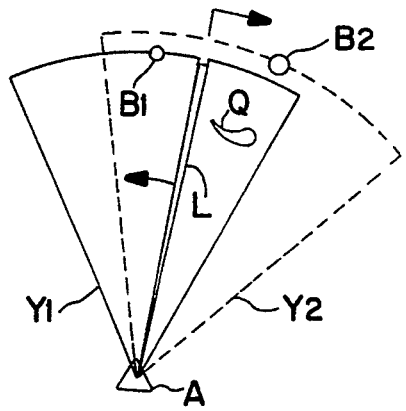
Figure 15C:
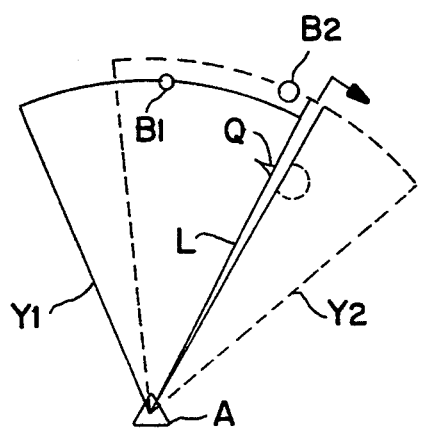
Figure 15D:
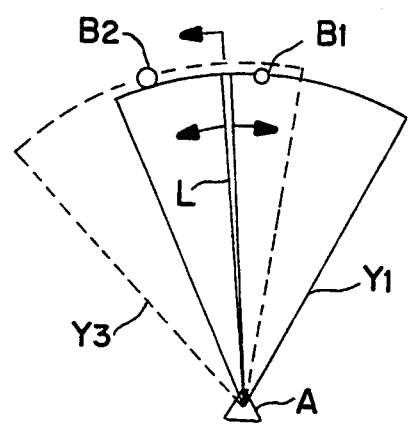
Figure 15E:
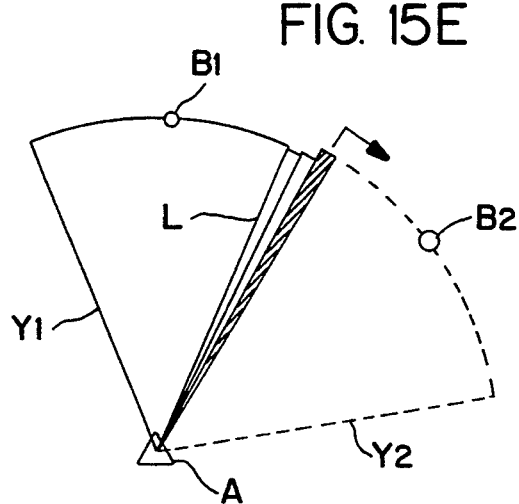
Figure 15F:
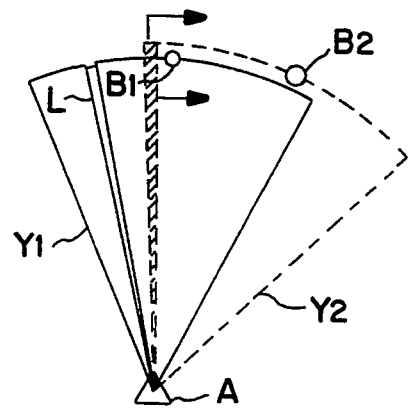
Figure 16A:
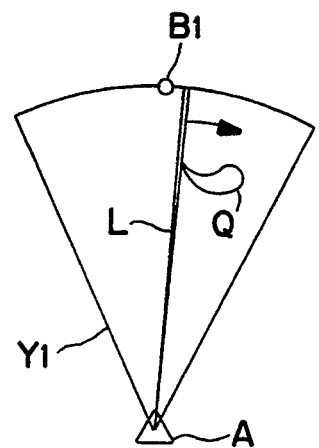
FIGS. 16A through 16C are diagrams illustrating a prior art method for tracking a school of fish.
Figure 16B:
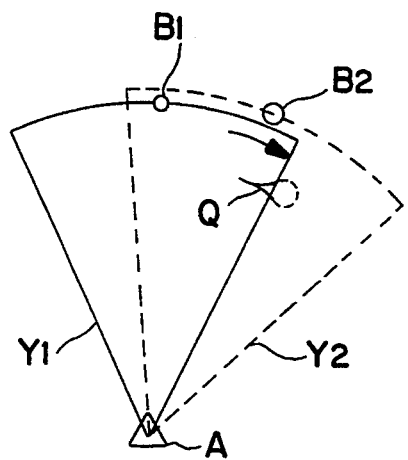
Figure 16C:
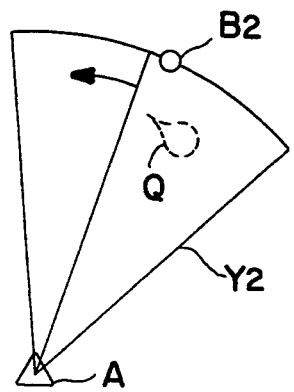

Referring to FIG. 15A, the position of own ship "A" (△) is set and the center "$B_1$" (●) of the turning movement is set, for example in the proceeding direction of the own ship. When the fish school "Q" is detected in the right side of a search area "$Y_1$" having a turning angle ω, the turning dial 31 and the setting key 32 are manipulated to turn the center of turning movement in the right direction to set a probing area "$Y_2$" so that the fish school "Q" is aligned with the center "$B_2$" (○) of the turning movement.

Figure 14:
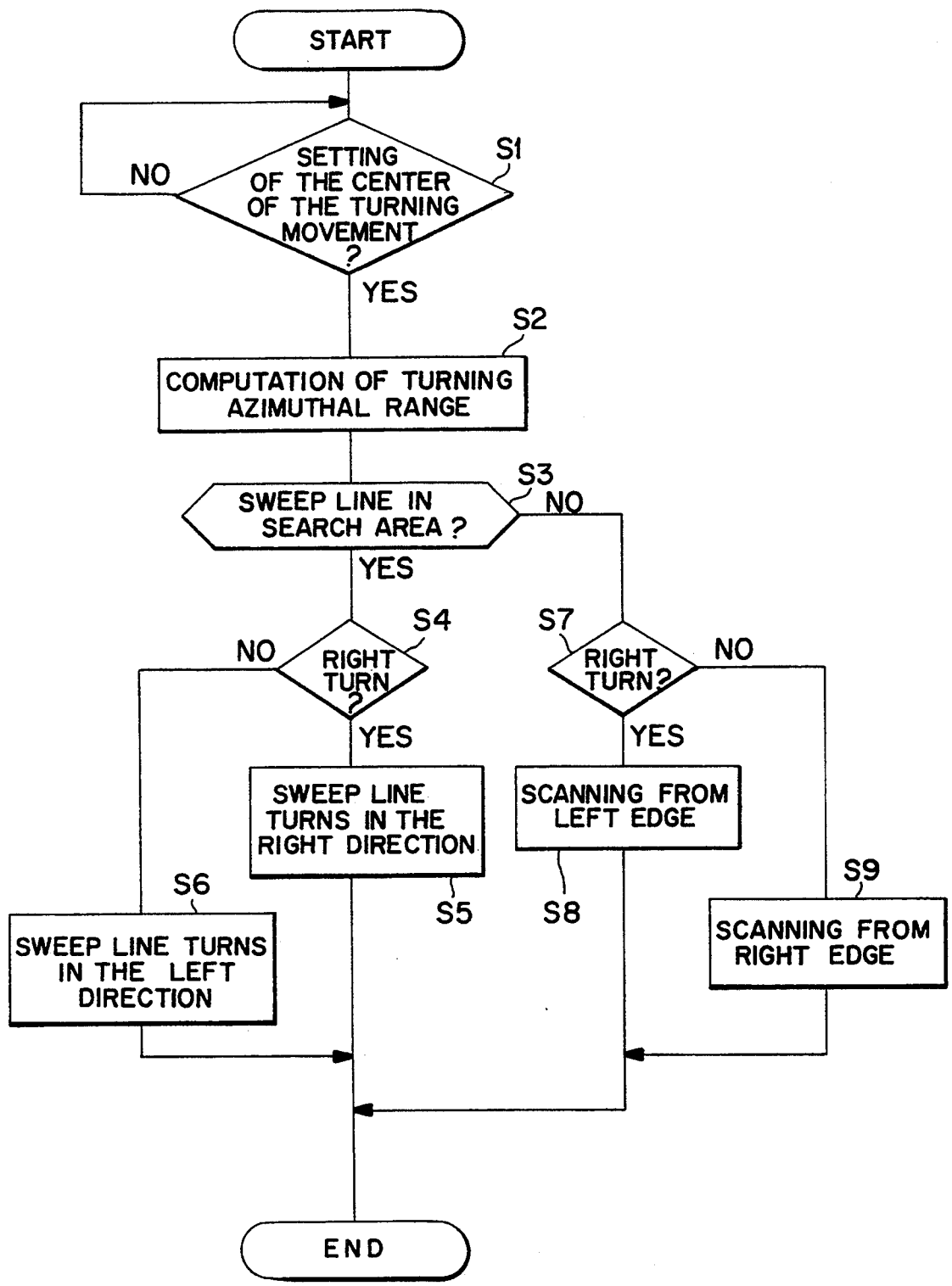
FIG. 14 is a flowchart illustrating contents of the display method carried out in the apparatus shown in FIG 13.

The center of the turning movement "$B_2$" is set in this way. The turning azimuthal range will be ±30° with the center "$B_2$" of the turning movement at the midpoint thereof, since the turning angle ω is 60°. Signals representative of the turning azimuthal range are supplied to the transmitting and receiving transducer driving section so that a search area determined by the turning angle is searched by the transmitting and receiving transducer 4. The moving direction of the sweep line "L" in the new search area "$Y_2$" is determined in accordance with programs stored in the ROM 201a. Here, contents of the program will be explained referring to flowchart shown in FIG. 14.

When the center of the turning movement "$B_2$" is set at first by the turning dial 31 and the setting key 32, the operation advances from a step S1 to a step S2, and the turning azimuthal range is computed based on the center of the turning movement "$B_2$" just set and on a predetermined turning angle ω. At a step S3, it is determined whether the current sweep line "L" is in a changed new probing area "Y$_2$". If it within the probing area, it is judged at a step S4 whether the moving direction of the center "B$_2$" of the turning movement set at a step S1 is the right direction or not. If it was moving in the right direction, the current sweep line "L" is moved in the right direction in the probing area "Y$_2$" at a step S5. While, if it was moving in the left direction, the current sweep line "L" is turned to left at a step S6. That is, in a new probing area "Y$_2$" changed, the sweep line "L" is turned in the same direction as the center of the turning movement was turned.

On the other hand, if the current sweep line "L" is outside of the new probing area "Y$_2$" changed, it is judged at a step S7 whether the moving direction of the center of the turning movement "B$_2$" is in the right direction or not. If it is moving in the right direction, the sweep line "L" is scanned from the left edge of the probing area "Y$_2$" at step S8. While, if it is moving in the left direction, the sweep line "L" is scanned from the right edge of the probing area "Y$_2$" at a step S9. That is, in the new probing area "Y$_2$" changed, the sweep line "L" is newly scanned from the edge the search area, which is closest to the pointing direction of the sweep line before the search area is changed.

When the center of the turning movement is thus changed. the sweep line "L" is scanned in an appropriate direction in the new probing area "Y$_2$" changed so that the fish school "Q" can be infallibly tracked.

Reception data obtained with this probe are stored in memory elements having addresses in the buffer memory 9. Then, the data read out of the buffer memory 9 are supplied to the indicator 14 through the processing circuit 17, the video memory 12 and the video signal converting section 13. As a result, the search area "Y$_2$" set is probed with the sweep line "L" being scanned in appropriate directions and is displayed.

The turning reference point can be, for example, at the left edge of the search area, and the transmitting and receiving transducer can be turned right at the turning reference point. Moreover, although the display method according to the present invention has been applied to a PPI sonar, this method can also be applied to a bottom sonar for sectorially probing the water in port and starboard directions.

Figure 17:
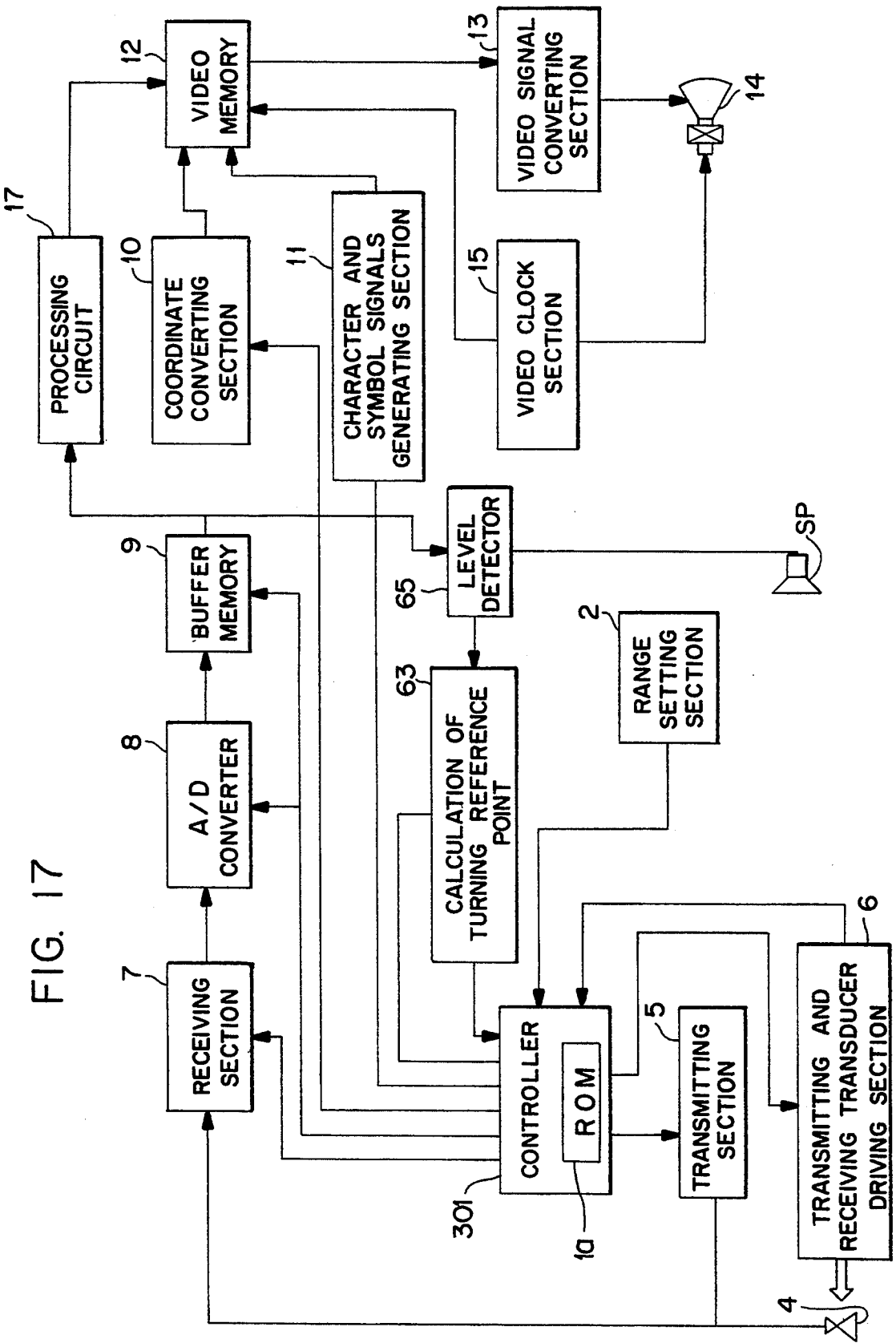
FIG. 17 is a block diagram of another embodiment of a PPI sonar according to the present invention.

Referring to FIG. 17, a controller 301 centrally controls a transmitting and receiving system. A range setting section 2 sets and inputs a probing distance range and an azimuthal range of a search area. A transmitting and receiving transducer 4 transmits ultrasonic detection signals and receives resultant echo signals. A transmitting section 5 supplies the transmitting and receiving transducer 4 with transmission signals. A transmitting and receiving transducer driving section 6 mechanically turns the transmitting and receiving transducer 4 in a horizontal plane. A receiving section 7 amplifies and detects received signals from the transmitting and receiving unit 4. An analog-to-digital converter 8 converts the received signals from the receiving section 7 from analog signals to digital signals based on sampling clocks. A buffer memory 9 stores signals from the A/D converter 8. A level detector 63 detects received data of high levels indicating a fish school of fish read out of the buffer memory 9. A speaker SP produces alarm sounds when a fish school is detected. Output signals from the buffer memory 9 are supplied to the video memory 12 through the processing circuit 17. A turning reference point calculating section 65 receives signals representative of a fish school from the level detector 65 and is supplied with a signal indicating a pointing direction of the transmitting and receiving transducer 4 from the controller 301 and a signal indicating an azimuthal detection range. The turning reference point calculating section 65 determines the turning reference point based on a detected fish school and supplies the controller 301 with signals representative of the turning reference point. The controller 301 calculates a position of own ship for display, for example a position of own ship on the screen of the indicator, based on the turning reference point supplied and supplies the coordinate converting section 10 with the resultant position.

Next, a procedure for determining the turning reference point will be explained.

Figure 18:
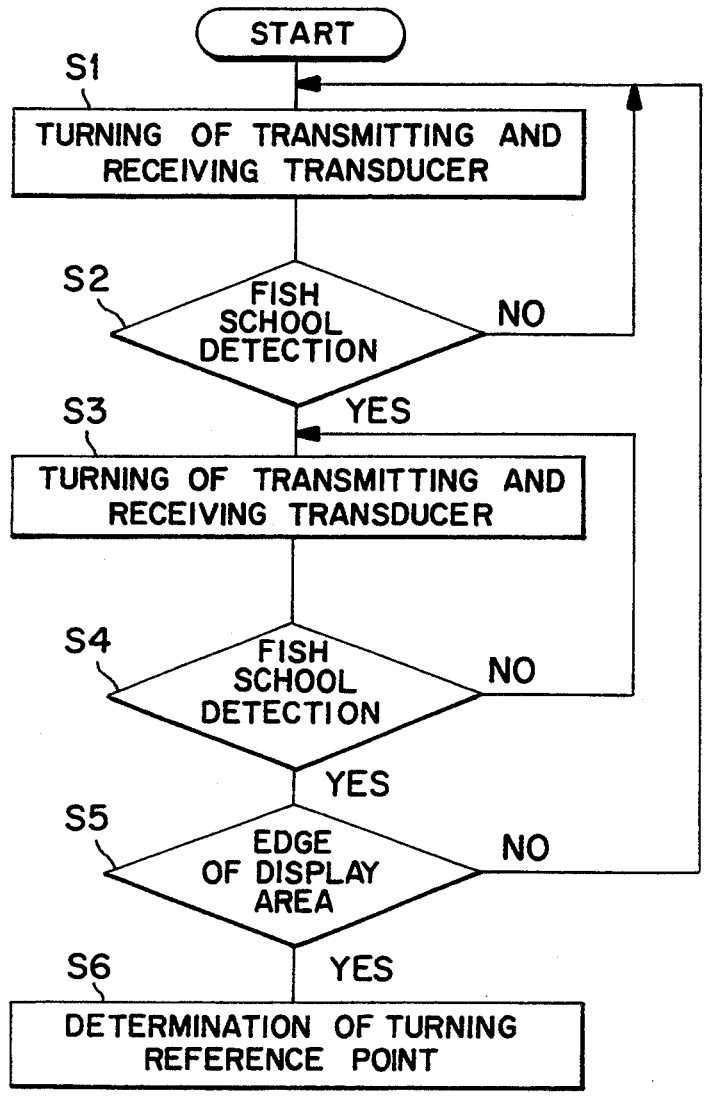
FIG. 18 is a flowchart for explaining operation of a turning reference point calculating section used in the embodiment of the PPI sonar according to the present invention shown in FIG. 17.
Figure 19:
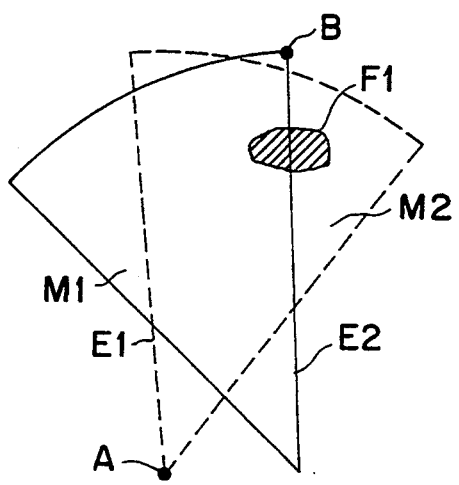
FIG. 19 is an example of display for explaining one feature of the embodiment of the PPI sonar according to the present invention shown in FIG. 17.

When the PPI sonar shown in FIG. 17 probes a sectorial probing area, the underwater circumstances of the area is displayed as shown in FIG. 19 in which the probing area and a fish school as M1 and F1 respectively. In this case, FIG. 18 shows that when an underwater search is started, the pointing direction of the transmitting and receiving transducer is turned, for example by 6° at a step S1. If a fish school is not detected at a step S2, the operation returns to the step S1 to further turn the transmitting and receiving transducer by 6°. This operation is repeated if a fish school is not detected at the step S2. If the fish school F1 is detected at a step S2, the procedure advances to a step S3 to further turn the pointing direction of the transmitting and receiving unit by 6°. If a fish school is not detected at a step S4, the procedure returns to the step S3 to further turn the transmitting and receiving unit by 6°. This operation is repeated if a fish school is not found at the step S4. If the school of fish F1 is detected at the step S4, the procedure advances to a step S5 to detect whether the pointing direction of the transmitting and receiving transducer coincides with an edge of the display area E1 or another edge thereof E2. If the transmission and reception beams formed by the transmitting and receiving transducer do not reach the edge of the display area, the operation returns to the step S1 to repeat the operations in the foregoing. If the pointing direction of the transmitting and receiving transducer coincides with an edge E1 of the display area at the step S5, the procedure advances to a step S6 to determine a head point "B" of a side boundary of the display area E1 as the turning reference point.

The controller 301 calculates the position of own ship on the screen of the indicator based on the turning reference point supplied and supplies the coordinate converting section 10 with the resultant position of own ship. As a result, a display area will be as M2 on the indicator 14 and the fish school F1 is displayed in the middle of the new display area M2. If the fish school F1 further moves in the left direction, the display area moves in the left direction following the movement of the fish school.

It is to be noted that in the foregoing embodiments, a single transmission and reception beam formed by the transmitting and receiving transducer is turned around in an azimuthal range of a search area in the right direction and in the left direction to search the water in a sectorial area and to display searched underwater conditions on the indicator. Instead of using the transmitting and receiving transducer 4, the transmitting and receiving unit shown in FIGS. 2 and 3 of the U.S. Pat. No. 4,672,589 (hereby incorporated by reference) can be used. The transmitting and receiving unit searches the water in a narrow azimuthal range. for example 30° by successively forming radiation and reception beams in different directions in the search area at a high speed. The transmitting and receiving unit is turned around in a wide sectorial search area having a wider angle about the center of the sector, for example 90° in the right direction and in the left direction so that the water in a sector form having an angle of 90° at the origin of the center is searched and displayed. In the same way as in the foregoing embodiments, when the transmitting and receiving unit forming a plurality of transmission and reception beams at a high speed is used, a desired probing area can be effectively displayed on an indicator by determining, for example a turning reference point of the transmitting and receiving unit or a position of own ship on the screen of an indicator.

Effects Produced by the Invention

As described above, according to the present invention, a lateral direction detection sonar is provided which is capable of displaying a desired search area on the screen of an indicator by effectively utilizing the screen by one setting operation.

According to the present invention, a PPI sonar is provided which is capable of displaying a desired search area on the screen of an indicator by effectively utilizing the screen by one setting operation.

According to the present invention, a PPI sonar is provided in which the. turning reference point in turning the transmitting and receiving unit in one direction and in the reverse direction is determined to define the position of own ship at an "appropriate point so that a desired search area can be displayed on the screen of an indicator.

According to the present invention, a PPI sonar is provided in which the position of own ship is set on the screen of an indicator to determine the turning reference point for turning movement of the transducer so that a desired search area can be displayed on the screen of an indicator.

According to the present invention, there can be provided a method for displaying a new probing area so that a fish school can be infallibly tracked after the previous probing area has been changed.

According to the present invention, a lateral direction detection sonar can be provided which is capable of automatically defining a new search area and a corresponding display area being moved following the movement of a target.

The present invention allows one to simplify the operation for setting a position of own ship and to increase the operability, since the position of own ship is automatically set at an appropriate point on an extension of a line connecting the center of the turning movement and the center of the screen, when the center of the turning movement in a search area is changed. If an intersection point on a predetermined guide line is used as a position of own ship, the search area can be always displayed at an appropriate portion with no parts thereof missing on the screen.

The present invention allows one to simplify the setting operation and to increase the operability, since the center of the turning movement in a search area is automatically set at an appropriate point on an extension of a line connecting the position of own ship and the center of the screen, when the position of own ship is moved to a desired point on the indicator. If the position of own ship is moved along a predetermined guide line when a movement key is operated, the search area can be always displayed at an appropriate portion with no parts thereof missing on the screen.

According to the present invention, a fish school can be infallibly tracked even after the probing area is changed ant operability can be increased, since the scanning direction of the sweep line in a changed new search area is determined so as to search in a new probing area when the center of the turning movement is changed.

We claim:

1. A PPI sonar for horizontally turning a transmitting and receiving ultrasonic transducer within an azimuthal range in one angular direction and in the reverse angular direction, to search underwater conditions in a sector form and to display the searched underwater conditions in a sector form with the position of own ship at the origin of the sector on an indicator comprising:
   turning reference point setting means for setting a reference point in correspondence to turning the transmitting and receiving transducer;
   display means for displaying the reference point in correspondence to turning the transmitting and receiving transducer on the indicator; and
   own ship's position setting means for determining the position of own ship for indication based on output signals of said turning reference point setting means.

2. The PPI sonar as claimed in claim 1 wherein the reference point in correspondence to the turning movement is at a mid-point in an angular range of a search area in which the transducer is turned around.

3. The PPI sonar as claimed in claim 1 wherein the reference point in correspondence to the turning movement is at a rightmost edge or at a leftmost edge in an angular range of a search area in which the transducer is turned around.

4. The PPI sonar as claimed in claim 3 wherein when a reference point in correspondence to the turning movement is changed by the turning reference point setting means, tile position of own ship is at a point on a line extending through a changed mid-point of the turning movement and the center of the screen of the indicator.

5. The PPI sonar as claimed in claim 4 wherein the position of own ship is at an intersection point obtained by intersecting a guide line on the screen of the indicator with a line connecting a changed mid-point of the turning movement and the center of the screen.

6. The PPI sonar as claimed in claim 5 wherein when a search area in a sector form having its radius represented as $L > r > L/2$ is displayed on a display area of $L \times L$, the guide line is lines forming a square with each line thereof being inside of the boundaries of the display area by $(L-r)$.

7. The PPI sonar as claimed in claim 6 wherein the radius is $3L/4$, and the guide line is lines forming a square with each line thereof being inside of the boundaries of the display area by $L/4$ on a display area of $L \times L$.

8. The PPI sonar as claimed in claim 5 wherein when a search area in a sector form, having its radius represented as $L > r > L/2$ is displayed on a display area of $L \times L$, the guide line is a circle contacting lines forming a square at four points with each line thereof being inside of the boundaries of the display area by $(L-r)$.

9. A PPI sonar for horizontally turning a transmitting and receiving transducer emitting and receiving ultrasonic signals in one direction within an azimuthal range in one angular direction and in the reverse angular direction to search underwater conditions in a sector form determined in accordance with a detection range with respect to the own ship, a horizontal and angular search range in which the transmitting and receiving transducer is turned around and a reference point in turning the transducer and to determine the position of own ship and the reference point in the turning movement on the indicator and to display the underwater conditions thereon comprising:

turning reference point setting means for setting a reference point in correspondence to turning the transmitting and receiving transducer;

display means for displaying the reference point in correspondence to turning the transmitting and receiving transducer; and own ship's position setting means for determining the position of own ship on an indicator based on output signals of said turning reference point setting means.

10. A PPI sonar for horizontally turning a transmitting and receiving ultrasonic transducer within an azimuthal range in one angular direction and in the reverse angular direction, to search underwater conditions in a sector form with the own ship at its center and to display the searched underwater conditions in a sector form with the position of own ship at the origin of the sector on an indicator comprising:

own ship's position setting means for determining the position of own ship on the indicator; and turning reference point setting means for setting a reference point in correspondence to turning the transmitting and receiving transducer based on output signals of said own ship's position setting means.

11. The PPI sonar as claimed in claim 10 wherein the reference point in correspondence to the turning movement is a mid-point in the azimuthal range of the search area in which the transducer is turned around.

12. The PPI sonar as claimed in claim 10 wherein the reference point in correspondence to the turning movement is at a rightmost edge or at a leftmost edge of the azimuthal range of the search area.

13. The PPI sonar as claimed in claim 10 wherein when the position of own ship is changed by the own ship's position setting means, the turning reference point setting means establishes the center point in correspondence to the turning movement at a point on an extended line of a line connecting the position of ship after being changed and the center of the screen of the indicator.

14. The PPI sonar as claimed in claim 10 wherein the position of own ship is moved along a predetermined guide line, when the position of own ship is changed.

15. The PPI sonar as claimed in claim 14 wherein when a search area in a sector form having its radius represented as $L>r>L/2$ is displayed on a display area of $L\times L$, the guide line is lines forming a square with each line thereof being inside of the boundaries of the display area by $(L-r)$.

16. The PPI sonar as claimed in claim 15 wherein the radius is $3L/4$, and the guide line is lines forming a square with each line thereof being inside of the boundaries of the display area by $L/4$ on a display area of $L\times L$.

17. The PPI sonar as claimed in claim 14 wherein when a search area in a sector form having its radius represented as $L>r>L/2$ is displayed on a display area of $L\times L$, the guide line is a circle contacting lines forming a square at four points with each line thereof being inside of the boundaries of the display area by $(L-r)$.

18. A PPI sonar for horizontally turning a transmitting and receiving ultrasonic transducer within an azimuthal range in one angular direction and in the reverse angular direction, to search underwater conditions in a sector form, there being a reference point in correspondence to turning the transducer, to determine the position of own ship and the reference point in correspondence to the turning movement on the indicator and to display the underwater conditions thereon comprising:

own ship's position setting means for determining the position of own ship on the indicator; and turning reference point setting means for setting a reference point in correspondence to the turning movement on the indicator based on output signals of said own ship's position setting means.

19. A display method in a PPI sonar for horizontally turning a transmitting and receiving ultrasonic transducer within an azimuthal range in one angular direction and in the reverse angular direction, to search underwater conditions in a sector form, there being a reference point in correspondence to turning the transducer, to determine a position of own ship and the reference point in correspondence to the turning movement on the indicator and to display the underwater conditions thereon, the method comprising the step of:

displaying a sweep line such that when the center of turning movement in a sectorial search area is changed, the sweep line is turned in a direction in which the center of turning movement is moved if the present sweep line is in a changed new search area, while if the present sweep line is in outside of a changed new search area, the sweep line starts to turn from an edge of the search area closer to the sweep line.

20. A PPI sonar for turning a transmitting and receiving ultrasonic transducer within an azimuthal range of a search area in one angular direction and in the reverse angular direction, so that the water in a wide range of directions is searched, and for displaying searched underwater conditions surrounding the own ship on an indicator, comprising:

turning reference point setting means for setting a reference point in correspondence to turning the transmitting and receiving transducer in the one angular and reverse directions; and own ship's position setting means for determining the position of own ship on the indicator based on output signals of said turning reference point setting means.

21. A PPI sonar for turning a transmitting and receiving ultrasonic transducer within an azimuthal range of a search area in one angular direction and in the reverse angular direction, so that the water in a wide range of directions is searched, and for displaying searched underwater conditions surrounding the own ship on an indicator comprising:

turning reference point setting means for setting a reference point in correspondence to turning the transmitting and receiving transducer in the one angular and reverse directions;

own ship's position setting means for determining the position of own ship on the indicator based on output signals of said turning reference point setting means;

turning reference point indicating means for indicating a mark representative of the turning reference point on the screen of the indicator; and own ship's indicating means for indicating a mark representative of the own ship on the screen of the indicator.

22. A PPI sonar for horizontally turning a transmitting and receiving transducer ultrasonic within an azimuthal range of a search area in one angular direction and in the reverse angular direction, to search the water in a sector form with the own ship at the origin thereof and for displaying searched underwater conditions in a sector form on an indicator with the position of the own ship at the center of the sector comprising:

turning reference point setting means for setting a reference point in correspondence to turning the transmitting and receiving transducer;

display means for displaying the reference point in correspondence to the turning movement of the transmitting and receiving transducer on the indicator; and own ship's position setting means having stored a plurality of own ship's positions for indication in a memory and determining the position of own ship by selecting own ship's position based on output signals of said turning reference point setting means.

23. A PPI sonar for horizontally turning a transmitting and receiving transducer in one direction within an azimuthal range of a search area in one angular direction and in the reverse angular direction to search the water in a sector form with the own ship at the origin thereof and for displaying searched underwater conditions in a sector form on an indicator with the position of the own ship at the center of the sector comprising:

detecting means for detecting objects;

turning reference point setting means for setting a reference point in correspondence to turning the transmitting and receiving transducer based on output signals of said detecting means; and own ship's position setting means for determining the position of own ship for indication based on output signals of said turning reference point setting means.

24. A display method in a PPI sonar for horizontally turning a transmitting and receiving ultrasonic transducer within an azimuthal range in one angular direction within an azimuthal range in one angular direction and in the reverse angular direction, to search underwater conditions in a sector form, there being a reference point in correspondence to turning the transducer, to determine position of own ship and the reference point in correspondence to the turning movement on the indicator and to display the underwater conditions thereon, the method comprising the step of:

displaying a screen such that at least one of a reference point in correspondence to turning the transmitting and receiving transducer or the position of own ship is set on the screen of the indicator so that a display area for displaying underwater conditions is set on the screen.

25. A PPI sonar for horizontally turning a transmitting and receiving ultrasonic transducer searching a sectorial area in an azimuthal range of directions in one angular direction and in the reverse angular direction, to search underwater conditions and for displaying searched underwater conditions on an indicator in a sector form with the position of own ship at the center thereof comprising:

turning reference point setting means for setting a reference point in correspondence to turning the transmitting and receiving transducer;

display means for displaying the reference point in correspondence to turning the transducer on the indicator; and own ship's position setting means for determining the position of own ship for indication based on output signals of said turning reference point setting means.

* * * * *